(12) United States Patent
Pathipati

(10) Patent No.: US 11,766,947 B2
(45) Date of Patent: Sep. 26, 2023

(54) DC FAST CHARGER WIRELESS-CHARGING ADAPTER

(71) Applicant: Zoox, Inc., Foster City, CA (US)

(72) Inventor: Vamsi Krishna Pathipati, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 259 days.

(21) Appl. No.: 17/334,275

(22) Filed: May 28, 2021

(65) Prior Publication Data

US 2022/0379760 A1 Dec. 1, 2022

(51) Int. Cl.
*B60L 53/38* (2019.01)
*B60L 53/12* (2019.01)
*B60L 53/10* (2019.01)

(52) U.S. Cl.
CPC .............. *B60L 53/38* (2019.02); *B60L 53/11* (2019.02); *B60L 53/12* (2019.02)

(58) Field of Classification Search
CPC .......... B60L 53/38; B60L 53/11; B60L 53/12; B60L 53/16; B60L 53/30; Y02T 10/70; Y02T 10/7072; Y02T 90/12; Y02T 90/14
USPC ........................................................ 320/108
See application file for complete search history.

(56) References Cited

U.S. PATENT DOCUMENTS

| 2012/0043931 A1* | 2/2012 | Terao ............... B60L 53/38 |
| | | 320/108 |
| 2014/0103872 A1 | 4/2014 | Ichikawa |
| 2015/0015419 A1 | 1/2015 | Halker et al. |
| 2019/0176637 A1 | 6/2019 | Booth et al. |

FOREIGN PATENT DOCUMENTS

| KR | 101220809 B1 | 1/2013 |
| KR | 20190011187 A | 2/2019 |

OTHER PUBLICATIONS

PCT Search Report and Written Opinion dated Aug. 23, 2022 for PCT Application No. PCT/US22/27851, 12 pages.

* cited by examiner

*Primary Examiner* — Paul Dinh
(74) *Attorney, Agent, or Firm* — Lee & Hayes, P.C.

(57) ABSTRACT

A wireless-charging adapter is connectable to a direct current (DC) fast charger and includes an induction coil for wireless charging a second induction coil on a vehicle. In some instances, the adapter may include an electrical connector to mate with a DC fast charger. In addition, the adapter may include hardware and/or software to receive a DC from the DC fast charger and provide an alternating current (AC) to the induction coil. The induction coil of the adapter may be positioned (e.g., on a ground surface) to align with an induction coil on a vehicle.

20 Claims, 6 Drawing Sheets

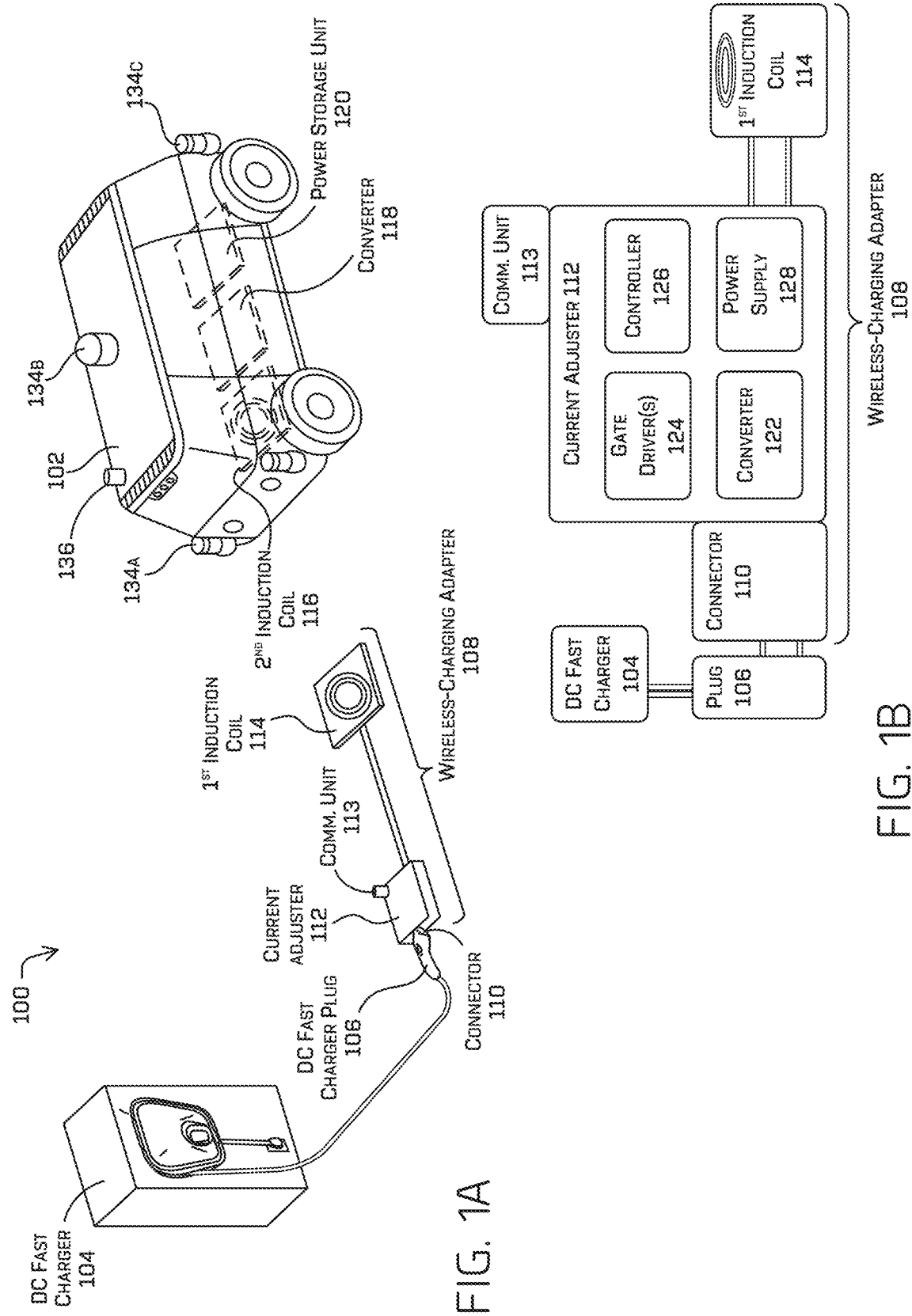

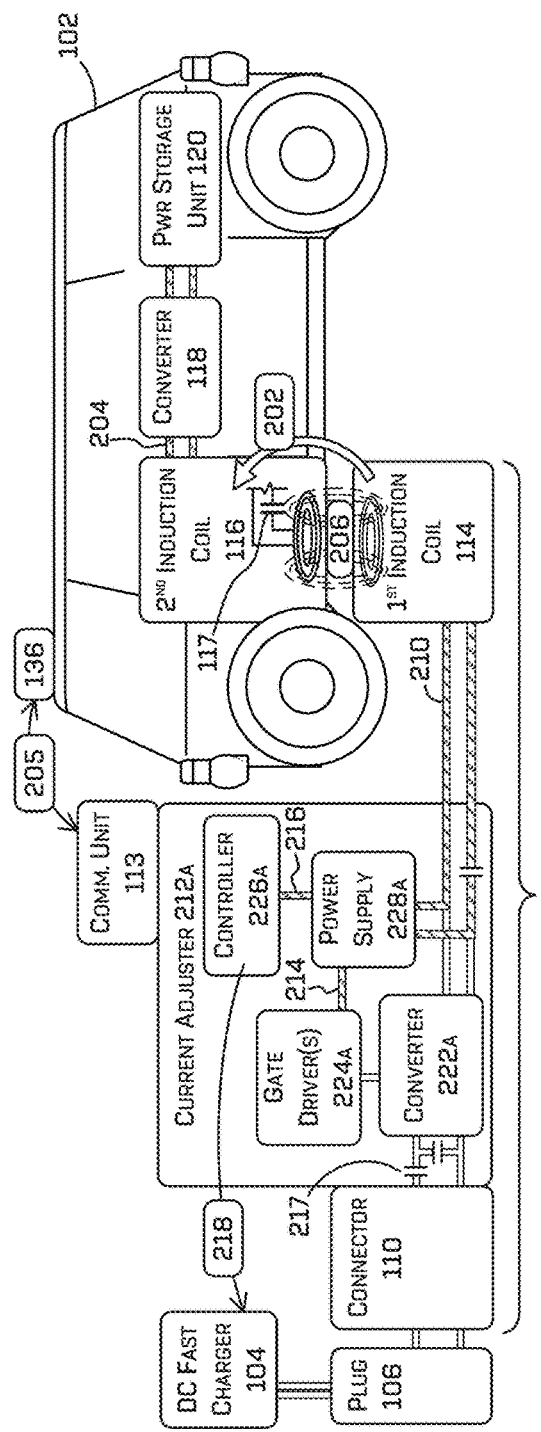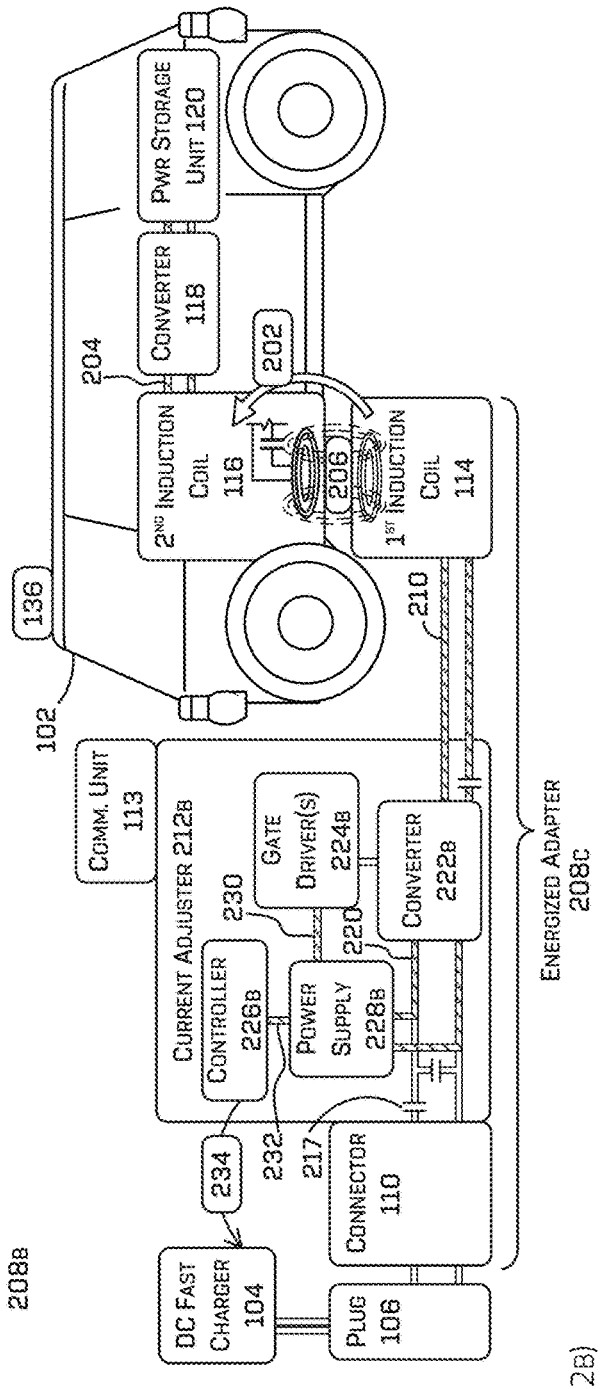
FIG. 2B
FIG. 2C
(ALT. CURRENT ADJUSTER 212B)

DC FAST CHARGER WIRELESS-CHARGING ADAPTER

BACKGROUND

Electric vehicles often rely on rechargeable batteries to supply electrical power to various components, such as electric motors. Recharging the battery may present a number of technical considerations. For example, the convenience, the duration, and the safety associated with the charging process may be important factors. In some conventional charging arrangements, wired charging using physical contacts (e.g., pin-type connectors) may be used. However, a wired connection may rely on proper manual and/or automated alignment and contact. In addition, physical contacts may wear and degrade over time with repeated usage (e.g., public charging stations, fleet-vehicle charging, performing plugging and unplugging for each charging session, etc.) and may require additional measures (e.g., safety, equipment protection, etc.) to account for potential power surges, operator risks, and other hazards.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

FIG. 1A is an example environment including a vehicle with a rechargeable battery and wireless-charging adapter coupled to a direct current (DC) fast charger.

FIG. 1B is a block diagram of an example wireless-charging adapter.

FIGS. 2A-2D depict a series of operations that may be carried out when recharging a vehicle battery using the wireless-charging adapter.

DETAILED DESCRIPTION

Figure 2A:
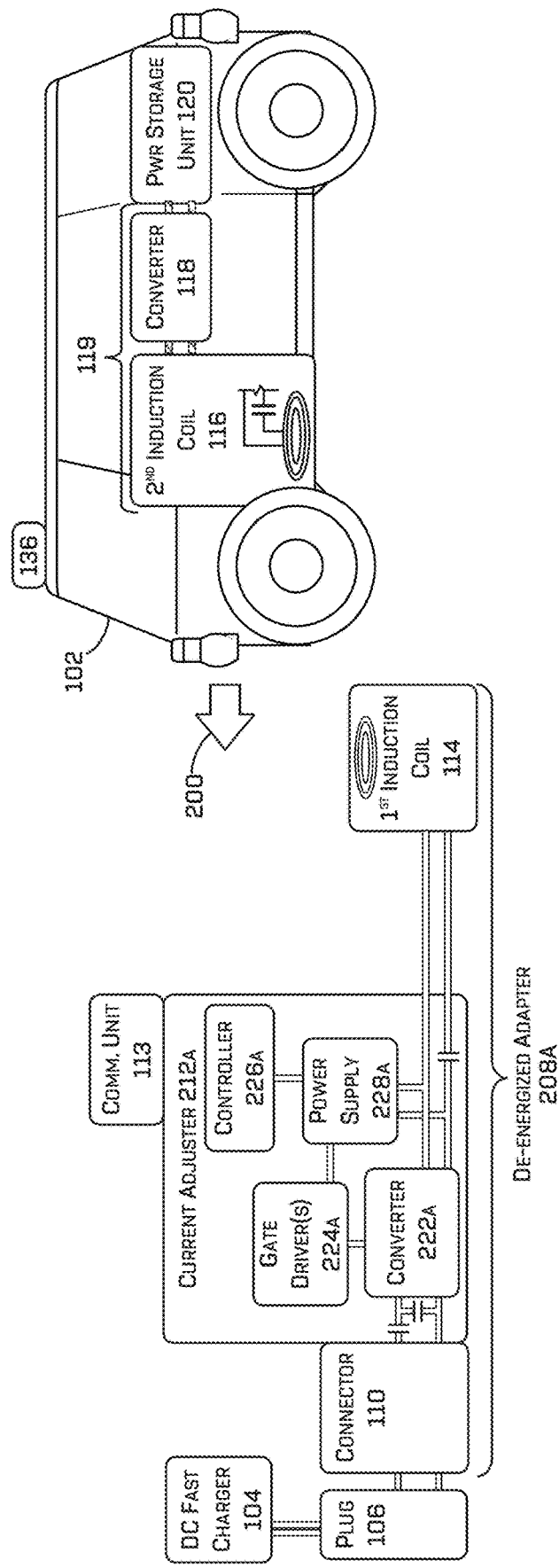

As described above, various considerations factor into recharging a battery of an electric vehicle, such as convenience, maintenance, infrastructure, and safety. This disclosure relates to techniques for wirelessly charging one or more batteries of a vehicle having one or more electrical propulsion units. For example, the disclosure includes a wireless-charging adapter that can be connectable to a direct current (DC) fast charger. As used in this disclosure, a DC fast charger is a contact-based charger (e.g., charging station) that uses a plug or other type of physical-contact connector to transmit or conduct DC to a mated component. In examples, the wireless-charging adapter is connectable to a DC fast charger by a physical-contact connector and includes a first induction coil (e.g., primary coil, offboard coil, or transmitter coil) for wirelessly transferring energy (e.g., non-contact power) to a second induction coil (e.g., secondary coil, onboard coil, or receiver coil) on a vehicle. For example, the adapter may include an electrical connector to mate with an electrical connector of a DC fast charger. In addition, the adapter may include hardware and software to signal the DC fast charger when a vehicle is proximate the adapter and ready to be charged. Further, the adapter may be configured to receive a DC from the DC fast charger and provide an alternating current (AC) to the first induction coil to charge the vehicle. The first induction coil may be positioned (e.g., on a ground surface) to align with the second induction coil on the vehicle.

In some examples, a wireless-charging sequence may be automatically initiated when the vehicle is proximate the adapter. For example, the adapter may be connected to the DC fast charger, and the first induction coil may be set in position (e.g., on a ground surface). That is, in some examples, the adapter may remain in a connected state to the DC fast charger (e.g., plugged in) prior to, between, and after repeated wireless charging sessions, and in other instances, the adapter may be mated to the DC fast charger (e.g., plugged in) prior to each charging session and disconnected (e.g., unplugged) after each charging session. Prior to the vehicle being proximate the DC fast charger, the adapter may include a low-power state (e.g., low power or no power). That is, before the vehicle is in position to wirelessly charge, even though the adapter is connected to the DC fast charger, the DC fast charger may not provide the DC to the adapter (e.g., for safety precautions), such that the first induction coil is not receiving any AC. A DC fast charger or other charging station may include various safety precautions, including determining whether a valid device is connected to receive power, that the system or receiver is not faulted or damaged, that the connection between the charger and receiver is not impeded, etc. In some examples, the adapter may determine that the vehicle is proximate the DC fast charger or the adapter, and in turn, power the adapter. For example, one or more signals, which indicate the vehicle is proximate the DC fast charger or the adapter, may be exchanged between the vehicle and the DC fast charger and/or between the vehicle and the adapter. Based on the one or more signals, power may be provided from the DC fast charger to the adapter to power the first induction coil. In some instances, wireless charging may be more convenient than conventional physical-contact charging systems and may reduce maintenance associated with wear of the physical electrical contacts of the vehicle that come into contact with the physical electrical contacts of the adapter. Also, when the adapter remains connected to the DC fast charger between charging sessions, maintenance and wear on the connections of the adapter to the DC fast charger can also be avoided. In addition, the low-power state described above may help to conserve energy and may reduce safety concerns associated with a charged first induction coil when no second induction coil is present.

Some examples of this disclosure are related to hardware and/or software components of the adapter. For example, the adapter may include an inverter (e.g., bi-directional AC to DC converter) that receives DC provided by the DC fast charger and that outputs AC to the first induction coil. Additionally, or alternatively, the adapter may include a microcontroller that can be used to facilitate requesting DC power from the DC fast charger to facilitate wireless charging when a vehicle is proximate the adapter. In some examples, when the adapter is in a low-power state (e.g. not receiving DC from the DC fast charger), components of the adapter can still support and execute adapter functionality. For example, the adapter may include a power supply unit (e.g., housekeeping power supply) to power components of the adapter, such as the microcontroller and inverter components (e.g., gate drivers), and in some examples, power may be provided by a second induction coil on the vehicle. In additional examples, the adapter may include a communications unit to exchange information with the vehicle, with a remote computing device (e.g., backend server), and/or with the charging station.

The power supply unit may support adapter operations in various manners. In certain examples, the power supply unit may receive an AC and output a DC (e.g., low voltage DC) to the microcontroller and the converter components. The power supply unit may receive the AC from various sources, and in some instances, the power supply unit may receive the AC from the first induction coil. For example, when the adapter is in a low-power state (e.g., no power), a second induction coil may be moved into position proximate the first induction coil (e.g., by a vehicle maneuvering and stopping directly above and/or overlapping at least a portion of the first induction coil), which may induce a relatively small amount of AC power (e.g., 100 watts) in the first induction coil. The small AC power may then be transmitted to the power supply unit, which receives the AC and outputs (e.g., transforms and/or rectifies) a DC (e.g., relatively low voltage) to the microcontroller.

Upon receiving power from the power supply unit, the microcontroller may perform various operations. For example, the microcontroller may exchange charging-related information with the vehicle, such as a vehicle identifier, capabilities of the electric-power system of the vehicle, a current state of charge of a power storage unit of the vehicle, vehicle-specific charging parameters or information, etc. In additional examples, upon receiving power, the microcontroller may send a message (e.g., via a contact-based coupling mimicking a conventional wired connection of the DC fast charger to a vehicle) to the DC fast charger to request that DC be supplied to be used to charge a battery of the vehicle. The message to the DC fast charger may be indicative of a vehicle being connected directly to the DC fast charger and may include various information used to release interlocks. In this sense, the AC that is induced in the first induction coil is (or triggers) the signal indicating the proximity of the vehicle to the DC fast charger (e.g., since the second induction coil is in position relative to the first induction coil). In some examples, prior to a vehicle being determined to be proximate the adapter, the adapter may be powered from or more additional or alternative sources, such as a battery or solar-powered source.

The adapter may be used in various manners. For example, in some instances, the adapter may be stowed with the vehicle and, when wireless charging is desired, the adapter may be attached to a DC fast charger (e.g., at a charging station). In other instances, one or more DC fast chargers (e.g., at a charging station) may be leased (e.g., by an entity with a fleet of electric vehicles), and each leased DC fast charger may be coupled to an adapter (and may or may not remain coupled to an adapter between charging sessions), in which case fleet vehicles of the lessor may use the leased DC fast chargers to wirelessly charge. Alternatively, an entity may have access to DC fast chargers and desire to implement wireless charging without incurring potentially significant infrastructure costs associated with a wireless-only charging terminal. As such, an adapter, which may be relatively inexpensive as compared with a wireless-only charging terminal, may be coupled to the DC fast chargers to implement the wireless charging. In other examples, the adapter may be interoperable with (e.g., configured to connect to, and communicate with) various types of DC fast chargers (e.g., SAE J1772, IEC 61851-3, ChAdeMO, Chinese GB/T, etc.)

The techniques described herein can be implemented in a number of ways to wirelessly charge a battery of a vehicle using a contact-based DC fast charger. Example implementations are provided below with reference to the following figures. Example implementations are discussed in the context of autonomous vehicles; however, the methods, apparatuses, and components described herein can be applied to a variety of components (e.g., charging a battery in a robotic system), and are not limited to autonomous vehicles. For instance, the techniques described herein may be utilized in driver-controlled vehicles electric vehicles. Additionally, or alternatively, the techniques can be utilized in connection with charging batteries of land vehicles, watercraft, aircraft, robots, computing devices, or any other battery powered device.

FIG. 1A is an example environment 100 in which an example vehicle 102 may maneuver into position during an example recharging event. The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more electric motors, one or more internal combustion engines, any combination thereof (e.g., by a hybrid power train), and/or any other suitable electric power sources. For the purpose of illustration, the example vehicle 102 is an at least partially electrically powered vehicle having two electrical propulsion units configured to provide the vehicle 102 with the ability to maneuver, each including a motor/inverter electrically coupled to one or more batteries configured to be recharged, as explained herein. For example, the vehicle 102 may be a bidirectional vehicle having a first drive module positioned in a front end and a second drive module positioned in a rear end. As used herein, a bidirectional vehicle is one that is configured to switch between traveling in a first direction of the vehicle and a second, opposite, direction of the vehicle. In other words, there is no fixed "front" or "rear" of the vehicle 102. In other examples, the techniques described herein may be applied to vehicles other than bidirectional vehicles.

The vehicle 102 may also include sensors 134a-134c, which may include a perception sensor, including a sensor capturing data of an environment around the vehicle 102 (e.g., lidar, camera, time-of-flight, sonar, radar, etc.). In addition, the vehicle 102 can also include one or more communication units 136 that enable communication between the vehicle 102 and one or more other local or remote computing devices via one or more protocols. For example, the vehicle 102 may exchange communications with other devices in the environment 100 (e.g., the DC fast charger 104 or the adapter 108) and/or with remote devices (e.g., a remote teleoperation computing device). Communications may be exchanged via physical and/or logical interfaces. For example, the communication unit 136 may enable Wi-Fi-based communication such as via frequencies defined by the IEEE 802.11 standards, short range wireless frequencies (e.g., Bluetooth, Zigbee, etc.), cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s).

The environment 100 also includes a contact-based direct current (DC) fast charger 104 (e.g., charging station), including a DC fast charger plug 106. The DC fast charger plug 106 may include one of various connector types, including SAE J1772, IEC 61851-3, ChAdeMO, Chinese GB/T, and the like. In accordance with examples of the disclosure, a wireless-charging adapter 108 may be coupled to the DC fast charger (e.g., mated with the plug 106 via a contact-based coupling) to facilitate wireless charging. The adapter 108 may be plugged into the DC fast charger and remain connected between charging sessions. In other examples, the adapter 108 may be plugged in, and unplugged, between charging sessions. For instance, in some examples, the adapter 108 may be unplugged and transported with the vehicle 102 between charging sessions. At a high level, the adapter 108 includes an electrical connector 110 to mate with the plug 106; a current adjuster 112, including hardware and software for managing and facilitating adapter 108 operations; a communications unit 113; and a first induction coil 114. In examples of the disclosure, the example vehicle 102 may be configured to use the adapter 108 for charging one or more batteries coupled to the vehicle 102. For example, the vehicle 102 may include a second induction coil 116 (e.g., mounted underneath the vehicle) to wirelessly receive a charge from the first induction coil 114, a converter 118 (e.g., power converter) to convert the AC from the first induction coil to DC, and a power storage unit 120 to store the DC from the converter 118. The converter 118 may include various components, such as an inverter, a rectifier, and/or a bi-directional AC to DC converter. In some examples, the second induction coil 116, the converter 118, and the power storage unit 120 may be part of the central body of the vehicle 102. In other instances, the second induction coil 116, the converter 118, and the power storage unit 120 may be part of one or more detachable drive assemblies. In alternative examples, each drive assembly may have a power storage unit, while the second induction coil 116 and the converter 118 are attached to the vehicle body and are connectable to the power storage unit 120. In other examples, the second induction coil 116, the converter 118, and the power storage unit 120 may include a module that can be connected to, and disconnected from, other vehicle components (e.g., drive assembly), such as for retrofitting and/or modularizing.

Referring to FIG. 1B, a schematic block diagram shows the adapter 108 coupled to the DC fast charger plug 106 (via the connector 110), and additional components of the adapter 108 are depicted. In accordance with examples of the disclosure, the adapter 108 includes the current adjuster 112 with various hardware and software for controlling and performing operations of the adapter 108. In some examples, the adapter 108 may include a disconnect device (not shown in FIG. 1B), such as a contactor, which may both establish and interrupt power from the DC fast charger 104 to the adapter 108 as necessary.

In additional examples, the current adjuster 112 can include a converter 122 (e.g., full-bridge DC to AC high frequency inverter, bi-directional converter, power converter, etc.) for changing a DC provided by the DC fast charger 104 to an AC to be provided to the first induction coil 114. In addition, the current adjuster 112 can include gate driver(s) 124 for controlling switches in the converter 122 and a controller 126, such as a microcontroller and/or control board. Among other things, the controller 126 may control operations of the current adjuster 112 (e.g., gate-driver operations, switch positions, disconnect device, etc.) and communicate with one or more other components to facilitate wireless charging. In addition, the controller 126 may include one or more processors and one or more computer-readable storage media storing instructions executable by the one or more processors, wherein the instructions, when executed, cause the controller 126 to perform operations. By way of example and not limitation, the processor(s) may include one or more Central Processing Units (CPUs), Graphics Processing Units (GPUs), field-programmable gate array (FPGA), complex programmable logic device (CPLD), integrated circuit(s), etc., or any other device or portion of a device that processes electronic data to transform that electronic data into other electronic data that can be stored in registers and/or memory. In addition, the computer-readable storage media may include both volatile and nonvolatile media and/or removable and non-removable media implemented in any method or technology for storage of information such as computer-readable instructions, data structures, program modules, and/or other data types. For example, the memory may store computer-readable instructions. Computer-storage media may include, but is not limited to, non-transitory media such as RAM, ROM, EEPROM, flash memory or other memory technology, or any other medium which may be used to store the desired information and which may be accessed by controller 126.

Furthermore, the current adjuster 112 can include a power supply 128 (e.g., power supply unit) to provide power to components of the current adjuster 112, such as to the gate driver(s) 124 and the controller 126. The power supply 128 may include various types of power supply units (e.g., isolated power supply unit), and in some instances, the power supply 128 may convert a current to a low voltage DC. The power supply 128 may also (or alternatively) include one or more other sources of DC, such as one or more batteries, solar-powered sources, etc. In some examples of the disclosure, the power supply 128 may include a housekeeping power supply. That is, in some instances, the adapter 108 may be in a low-power state (e.g., de-energized), such as when no second induction coil is present, and as such, the housekeeping power supply may provide or receive a low level of power to maintain basic or startup functionality. The current adjuster 112 may include other components. For example, the current adjuster 112 may include an input filter cap (e.g., 238 in FIG. 2D) for filtering high frequency voltage ripple (e.g., from the DC provided by the DC fast charger). In addition, the current adjuster 112 may include a compensation capacitor (e.g., 240 in FIG. 2D) or primary capacitor (e.g., to facilitate series-series compensation), which may help to align component resonance.

In additional examples, the wireless-charging adapter 108 may include one or more communication units 113 that enable, via a wireless communication link or channel, communication between the adapter 108 and one or more other local or remote computing devices via one or more protocols. For example, the adapter 108 may exchange communications with other devices in the environment 100 (e.g., the DC fast charger 104 or the vehicle 102) and/or with remote devices (e.g., a remote teleoperation computing device). Communications may be exchanged via physical and/or logical interfaces. For example, the communication unit 113 may enable Wi-Fi-based communication such as via frequencies defined by the IEEE 802.11 standards, short range wireless frequencies (e.g., Bluetooth, Zigbee, etc.), cellular communication (e.g., 2G, 3G, 4G, 4G LTE, 5G, etc.), millimeter wave communications, satellite communication, dedicated short range communications (DSRC), or any suitable wired or wireless communications protocol that enables the respective computing device to interface with the other computing device(s). As such, in some examples, the adapter 108 (e.g., using the communication unit 113) may communicate directly with a vehicle (e.g., using the communication unit 136) or may communicate indirectly with the vehicle through a backend server (e.g., both the adapter 108 and the vehicle 102 communicate via cellular communication with the backend server, which facilitates message exchanges).

In one or more examples of the disclosure, the adapter 108 is connected to the DC fast charger 104 by mating the electrical connector 110 to the plug 106. A DC that is provided by the DC fast charger 104 is received by the adapter 108. In some examples, the DC from the DC fast charger may be a high voltage DC in a range of about 200V to about 1000V. The converter 122, based on inputs (e.g., control signals) from the gate driver(s) 124, changes the DC to an AC, and the AC is provided to the first induction coil 114 (and also possibly to the power supply 128). The first induction coil 114 may, as a result of the AC flow from the converter 122, provide wireless charging (e.g., non-contact power) to a second induction coil (e.g., via a Series Series-Resonant Inductive Power Transfer (SS-RIPT) link). In additional examples, the adapter 108 may monitor the provision of power to the second induction coil and may terminate the DC signal from the DC fast charger 104 based on various events. For example, the adapter 108 may detect a change in impedance (e.g., when the vehicle 102 having a second induction coil moves away from the adapter 108), and based on the change, terminate the DC (e.g., via the disconnect device or via signaling). In other examples, the adapter 108 may receive a signal from the vehicle 102 declining non-contact power (e.g., declining additional power such as when the power storage unit is sufficiently charged above a threshold).

As described above, prior to the vehicle being proximate adapter 108, the adapter 108 may include a low-power state (e.g., low power or no power). That is, before the vehicle is in position to wirelessly charge, even though the adapter 108 may be connected to the DC fast charger 104 (via the connection between the plug 106 and the connector 110), the DC fast charger 104 may not provide the DC to the adapter 108, such that the first induction coil 114 is not receiving any AC (e.g., from the current adjuster 112). As such, aspects of this disclosure describe subject matter for determining that the vehicle is proximate the DC fast charger 104 and/or proximate the adapter 108 and/or for determining the second induction coil 116 is proximate the first induction coil. In addition, some aspects may, based on the determining, request DC from the DC fast charger 104 or otherwise trigger a transfer of DC from the DC fast charger to the adapter 108.

Referring now to FIGS. 2A-2D, a sequence of operations is pictorially depicted that may be executed in accordance with an example of this disclosure and that may facilitate wireless charging of a vehicle power storage unit 120. At a high level, FIG. 2A depicts a de-energized wireless-charging adapter 208a connected to the DC fast charger 104 via the plug 106. As used in this disclosure, a de-energized wireless-charging adapter 208a includes a wireless-charging adapter (e.g., adapter 108) that is coupled to a DC fast charger 104 (via the plug 106) and that is not receiving DC power from the DC fast charger 104 for charging a corresponding vehicle. Power from the DC fast charger 104 may be withheld from distribution to the plug 106 for one or more various reasons. For instance, for safety precautions, the DC fast charger 104 may be configured to provide power only when safety conditions have been met related to communication(s), circuit checks, isolation, etc.

In addition, FIG. 2A depicts a vehicle 102 having the second induction coil 116 that is located or positioned a distance away from the first induction coil 114 (e.g., not proximate). In examples of the disclosure, the second induction coil 116 (e.g., a portion of the second induction coil including an edge and/or the center of the second induction coil) is greater than a threshold distance away from the first induction coil 114 (e.g., a portion of the second induction coil including an edge and/or the center of the first induction coil). For example, the threshold distance may be at least about 200 millimeters in each of the X, Y, and Z orientations, in which the X-Y plane extends generally parallel with a ground surface on which the first induction coil 114 rests and the vehicle 102 is driving, and the Z orientation extends perpendicular to the X-Y plane. This 200 millimeter threshold is merely an example, such that the threshold may be less than 200 millimeters (e.g., 150 millimeters) or greater than two meters (e.g., 250 millimeters). In addition, the respective thresholds in each orientation may be consistence across all of the orientations (e.g., the threshold in each of the X, Y, and Z orientation may be similar), or alternatively, the threshold in one orientation may be different a threshold in another orientation (e.g., the threshold in the X orientation may be different from the threshold in the X orientation). In addition, FIG. 2A depicts the converter 118 and the power storage unit 120. In accordance with aspects of this disclosure, the second induction coil 116 and the converter 118 may comprise at least part of a vehicle-battery charging assembly 119 for charging the power storage unit 120. In addition to the components illustrated, the vehicle-battery charging assembly 119 may include one or more processors and one or more computer-readable media.

In some examples, in FIG. 2A the vehicle 102 may be in a pre-charging mode that may arise or be triggered by various conditions. For example, the vehicle 102 may detect that a charge level of the power storage unit 120 is below a threshold and/or the vehicle 102 may determine (e.g., based on mapping and location tracking) that the vehicle is in a charging-station depot (e.g., a lot equipped with one or more charging stations). Upon entering the pre-charging mode, the vehicle 102 may initiate various operations to maneuver into a position proximate to a wireless-charging adapter. For example, the vehicle 102 may determine a trajectory that, when executed, positions the vehicle in a designated charging spot and in a position relative to a wireless-charging adapter conducive to charging. In other examples, using the vehicle-battery charging assembly 119, an AC may be perturbated (in the second induction coil) to assist with detecting the first induction coil 114 of the de-energized adapter 208a.

Referring to FIG. 2B, the second induction coil 116 is depicted proximate the first induction coil 114, such as after the vehicle 102 has maneuvered forward (as indicated by the arrow 200 in FIG. 2A). For example, the second induction coil 116 may be spaced a distance apart from the first induction coil 114 equal to or less than the threshold distance (e.g. equal to or less than 200 millimeters in each of the X, Y, and Z orientations). In addition, the second induction coil 116 can receive a signal 202 indicating the second induction coil 116 and the first induction coil 114 are proximate one another (e.g., spaced apart by a distance equal to or less than the threshold). The signal 202 may take many forms. For example, in some examples of the present disclosure, prior to and upon being positioned proximate the first induction coil 114, the second induction coil 116 may be receiving an AC (e.g., a current converted to AC from a DC from the power storage unit 120 and perturbated as described above), such that the first induction coil 114 creates an impedance detected by the second induction coil 116 (e.g., the detected impedance being the signal 202). That is, the converter 118 may provide an AC to the second induction coil 116 at various times (e.g., perturbated low voltage AC), such as in FIG. 2A when the second induction coil 116 is greater than a threshold distance away from the first induction coil 114. In that example, when the vehicle 102 is maneuvered over (e.g., close to, or at least partially, overlapping) the first induction coil 114, such as in FIG. 2B, the presence of the first induction coil 114 may create the impedance detected as the signal 202. In some examples the second induction coil 116 (or components associated with the second induction coil 116) may be configured to increase a likelihood the second induction coil 116 and first induction coil 114 will communicate or otherwise sense or detect one another. For example, the second induction coil 116 may be coupled with a secondary capacitor 117, which is configured similarly to a primary capacitor (e.g., 242 in FIG. 2D) of the current adjuster. In addition, the second induction coil 116 may include components to determine whether the impedance is within a target range indicating a proximity of the first induction coil, which may increase a likelihood that the signal 202 (in the form of the detected impedance) is associated with a proximity of the first induction coil, as opposed to a lower or higher impedance that may be created by another object.

The signal 202 indicating the second induction coil 116 is proximate the first induction coil 114 may include other types of signals in addition to, or as an alternative to, the detected impedance. For example, the second induction coil 116 may include (or be associated with) a proximity sensor that detects a proximity of the first induction coil 114 (e.g., at a distance equal to or less than the threshold distance). In one instance, the proximity sensor may include a Hall effect sensor, magnetometer, magnetic pickup, or other sensor that detects a magnet coupled to the first induction coil 114 (or elsewhere as part of the adapter 108), in which case the signal 202 may include the sensor data detected by the sensor. In some examples, the sensor may detect a magnetic-field magnitude that, when exceeding a threshold, indicates a proximity of a magnet. In another aspect, the proximity sensor could include a camera providing image data representing the first induction coil 114, or other perception sensor providing perception data representing the first induction coil 114.

In addition to receiving the signal 202 indicating the second induction coil 116 is proximate the first induction coil 114, other operations may be performed to verify the vehicle 102 is properly positioned for charging. For example, the vehicle 102 may, using one or more sensors, verify that a current position of the vehicle 102 aligns with a location of the adapter. In some examples, the vehicle 102, or a remote computing device in communication with the vehicle 102, may maintain maps storing a location of the wireless-charging adapter. Once a position of the vehicle 102 has been determined (e.g., using one or more vehicle sensors), the vehicle position may be compared to the stored map to verify that the vehicle position aligns with the adapter. In other examples, the vehicle 102 may use one or more sensors (e.g., lidar, radar, camera, etc.) to verify that a vehicle position is aligned with the adapter.

In examples of the disclosure, AC 204 may be provided to the second induction coil 116 in response to the signal 202 being detected and/or in response to verifying that the vehicle position aligns with a position of the adapter. That is, DC from the power storage unit 120 may be converted to AC (by the converter 118) and provided as AC 204 to the second induction coil 116. In examples of this disclosure, the AC in the second induction coil 116 may create a magnetic field 206, which induces an AC 210 (e.g., high frequency AC) in the first induction coil 114 and in-turn energizes the adapter (e.g., "energized adapter 208b" in FIG. 2B). The AC 210 may be transmitted to the current adjuster 212a, and in some examples to the power supply 228a, which converts the AC 210 to a low voltage DC (e.g., via rectification). In some instances, the power supply 228a may include a transformer for converting the high frequency high voltage AC 210 to a lower voltage and a rectifier to output the low voltage DC. The low voltage DC may include various magnitudes, and in examples, the low voltage DC is in a range of about 3 volts to about 24 volts. The low voltage DC may then be provided as DC 214 to the gate driver(s) 224a and DC 216 to the controller 226a.

In further examples, the energized adapter 208b, having received power, may exchange information 205 with the vehicle 102. For example, the adapter 208b may establish a wireless communication link between the communications unit 113 of the energized adapter 208b and the communication unit 136 of the vehicle. In addition, the adapter may, via the wireless communication link, receive one or more communications from the communications unit 136 of the vehicle 102 (e.g., directly and/or through a backend server). The information 205 may include both information that is used to initiate power transfer, as well as information that may be used throughout the charging to safely provide power (e.g., short circuit detection, overheating detection, etc.). Among other things, the information from the vehicle 102 may include a vehicle identifier, a current charge state (e.g., state of charge (SOC) levels) related to the vehicle power storage unit, adapter-use authorization, details of the electric power system of the vehicle 102, vehicle-specific charging parameters (e.g., maximum and/or ranges of voltage, current, etc.), and any other information that may be used to effectively and safely provide power from the DC fast charger to the vehicle 102. Additional operations may be triggered by (or coincide with) powering the energized adapter 208b. For example, a contact 217 may be activated to receive DC from the DC fast charger (e.g., as part of an isolation test, as part of receiving DC to wirelessly charge, etc.)

In additional examples, the controller 226a (powered by the DC 216) transmits one or more communications 218 (e.g., messages) to the DC fast charger 104 indicative of a vehicle being connected to the DC fast charger for contact-based charging. The one or more communications 218 may include various data, and in some examples, the communication(s) 218 mimic vehicle communications and safety checks, such as when the plug 106 is mated directly to a vehicle for charging. For example, if the adapter 208b has not already determined a protocol of the DC fast charger 104 (e.g., received some identifier or other identification of the protocol), then the communication(s) 218 may query the DC fast charger 104 to determine a protocol (e.g., SAE J1772-CCS1, CHAdeMO, IEC-type 2, Chinese GB/T, etc.). However, in some instances, the adapter 208b may have already determined a protocol of the DC fast charger 104 (e.g., when initially connected), in which case the query communication(s) may be withheld. In addition, the communication(s) 218 may include any other data (e.g., signaling protocol) complying with the determined protocol to initiate the DC supply from the DC fast charger 104. For example, the DC fast charger and the adapter may exchange signals for performing external isolation tests or other safety checks. The communication(s) 218 may be communicated using one or more wireless networks, such as Bluetooth, Zigbee, etc., or via a wired connection (e.g., via a pin) between the connector 110 and the plug 106. After the signaling protocol, communication, and safety checks are performed via the communication(s) 218, the DC fast charger 104 may provide a DC to the energized adapter 208b.

FIG. 2B depicts one arrangement of hardware and software that might be included in the adapter 208a or 208b (and specifically in the current adjuster 212a), and referring briefly to FIG. 2C, an alternative hardware arrangement is depicted that might be included in a wireless-charging adapter 208c (e.g., in an alternative configuration of a current adjuster 212b), in accordance with another aspect of this disclosure. In FIG. 2C, the adapter 208c includes similar components to the adapter 208b, including the connector 110, the first induction coil 114, and the current adjuster 212b; however, the components of the current adjuster 212b may be configured differently than the current adjuster 212a in FIG. 2B. The current adjuster 212b may include a converter 222b, gate driver(s) 224b, a controller 226b, and a power supply 228b. Similar to the description related to FIG. 2B, in FIG. 2C the high frequency AC 210 is still provided from the first induction coil 114, except in the adapter 208c the AC 210 is rectified in the converter 222b before being passed as high voltage DC 220 to the power supply 228b. The power supply 228b may then provide a low voltage DC 230 (e.g., between about 3 volts and about 24 volts) to the gate driver(s) 224b and a low voltage DC 232 (e.g., between about 3 volts and about 24 volts) to the controller 226b. Similar to the controller 226a in FIG. 2B, the controller 226b in FIG. 2C (upon being powered) exchanges information with the vehicle 102, operates the contact 217, and sends one or more communication(s) 234 to the DC fast charger 104 to initiate provision of DC power to the adapter 208c. Similar to the subject matter described with respect to FIG. 2B, after the signaling protocol, communication, and safety checks are performed via the communication(s) 234, the DC fast charger 104 may provide a DC to the energized adapter 208c.

Figure 2D:
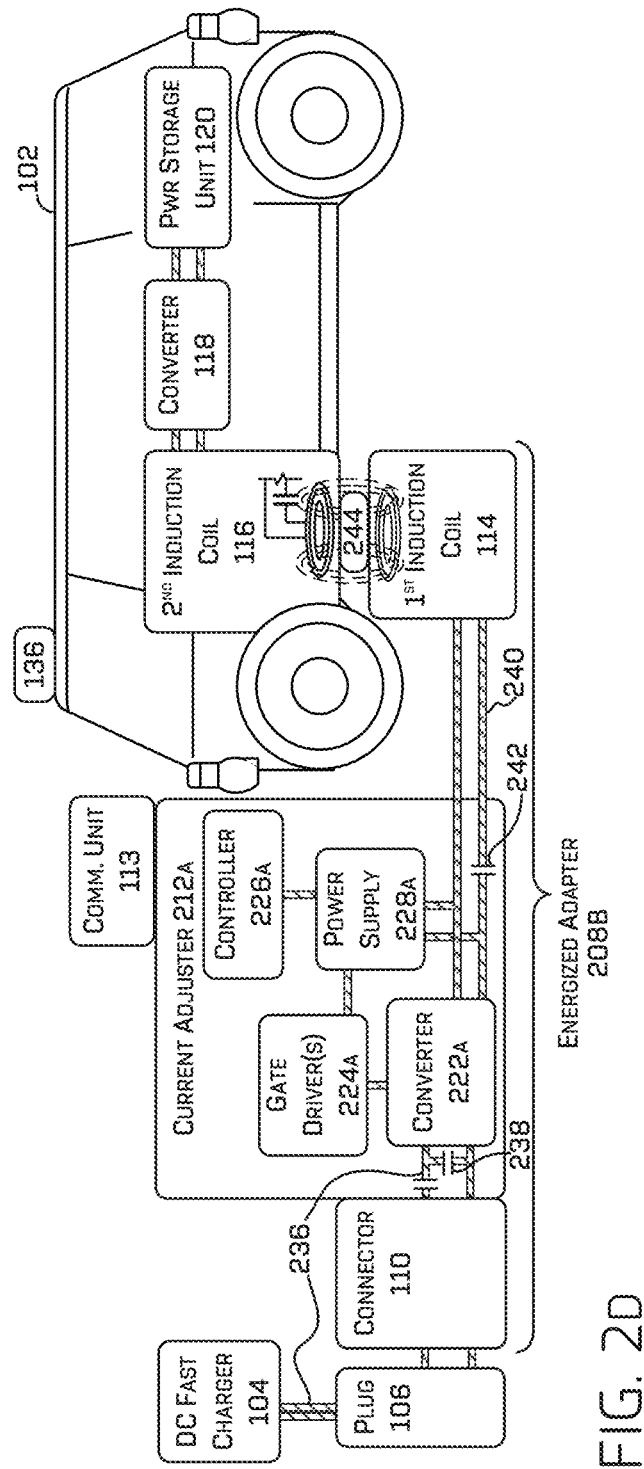

Referring now to FIG. 2D, once the signaling protocol, communication, and safety checks are performed via the communication(s) 218, the DC fast charger 104 provides a DC 236, which is transmitted to the converter 222a. In some examples, the current adjuster 212a may include an input filter cap 238 for filtering high frequency voltage ripple (e.g., from the DC provided by the DC fast charger). The converter 222a can change the high frequency DC 236 to a high frequency AC 240, which is provided to the first induction coil 114 (e.g., after compensated via the capacitor 242). The high frequency AC 240 flowing through the first induction coil 114 creates a field 244 that induces an AC in the second induction coil 116. The AC induced in the second induction coil 116 may be rectified to DC and transmitted to the power storage unit 120 for recharging.

FIG. 2D depicts the current adjuster 212a; however, in other aspects similar operations may be performed by the current adjuster 212b depicted in FIG. 2C. For example, after the communications 234, a DC is provided by the DC fast charger 104 to the current adjuster 212b, which may convert the DC to an AC (via the converter 222b) and provide a high frequency AC to the first induction coil 114.

In additional examples, the adapter 208b or 208c may monitor the provision of power to the second induction coil 116 and may control (e.g., reduce, increase, terminate, etc.) the DC signal from the DC fast charger 104 based on various events. For example, using the communication units 113 and 136 and during the wireless charging, the adapter 208b or 208c and the vehicle 102 may exchange information related to the present charge state and power-system status of the vehicle. As the charge state of the power storage unit 120 increases (or other conditions, such as system temperatures), the adapter 208b or 208c can communicate with the DC fast charger to adjust the DC 236 or can self0regulate or throttle the power. In other examples, the adapter 108 may detect a change in impedance (e.g., when the vehicle 102 having a second induction coil 116 moves away from the adapter 108), and based on the change, terminate the DC (e.g., via the disconnect device or via signaling) based on an inference the vehicle is greater than a threshold distance away from the adapter (e.g., no longer proximate). In other examples, the adapter 108 may receive a signal from the vehicle 102 declining non-contact power or indicating a state of charge above a threshold (e.g., declining additional power such as when the power storage unit is sufficiently charged above a threshold). In still further examples, the adapter 208b may detect that a communication link between the adapter 208b and the vehicle 102 (e.g., between the communication units 113 and 136) is lost, and based on the communication link being lost, the adapter 208b may terminate the DC from the DC fast charger 104.

FIGS. 2A-2D, and the related description, include some examples of a proximity being determined (e.g., equal to or less than a threshold distance) between the second induction coil 116 and the first induction coil 114, and based on the proximity determination, initiating a charging sequence (e.g., satisfy safety checks and initiate DC transfer from the DC fast charger). In other aspects of the disclosure, proximity may be determined using other techniques. For example, the vehicle 102 may send a communication (e.g., using the communication unit 136) to the adapter 108, 208a, 208b, or 208c; to the DC fast charger; to a backend system of the DC fast charger; or any combination thereof, and the communication from the vehicle may initiate a signaling protocol (e.g., pursuant to SAE J1772-CCS1, CHAdeMO, IEC-type 2, Chinese GB/T, etc.). Based on a compliant signaling protocol exchange, the DC fast charger 104 may then provide a DC to the adapter 108, 208a, 208b, or 208c, which in turn may power the first induction coil 114. In addition, the adapter 108, 208a, 208b, or 208c may include a proximity sensor for detecting a proximity of the vehicle and/or the second induction coil. For example, the adapter may include a sensor that detects a magnetic field resulting from a proximity of the second induction coil (e.g., where the sensor of the adapter includes a Hall effect sensor, magnet pickup, etc. and the second induction coil includes a magnet).

Figure 3:
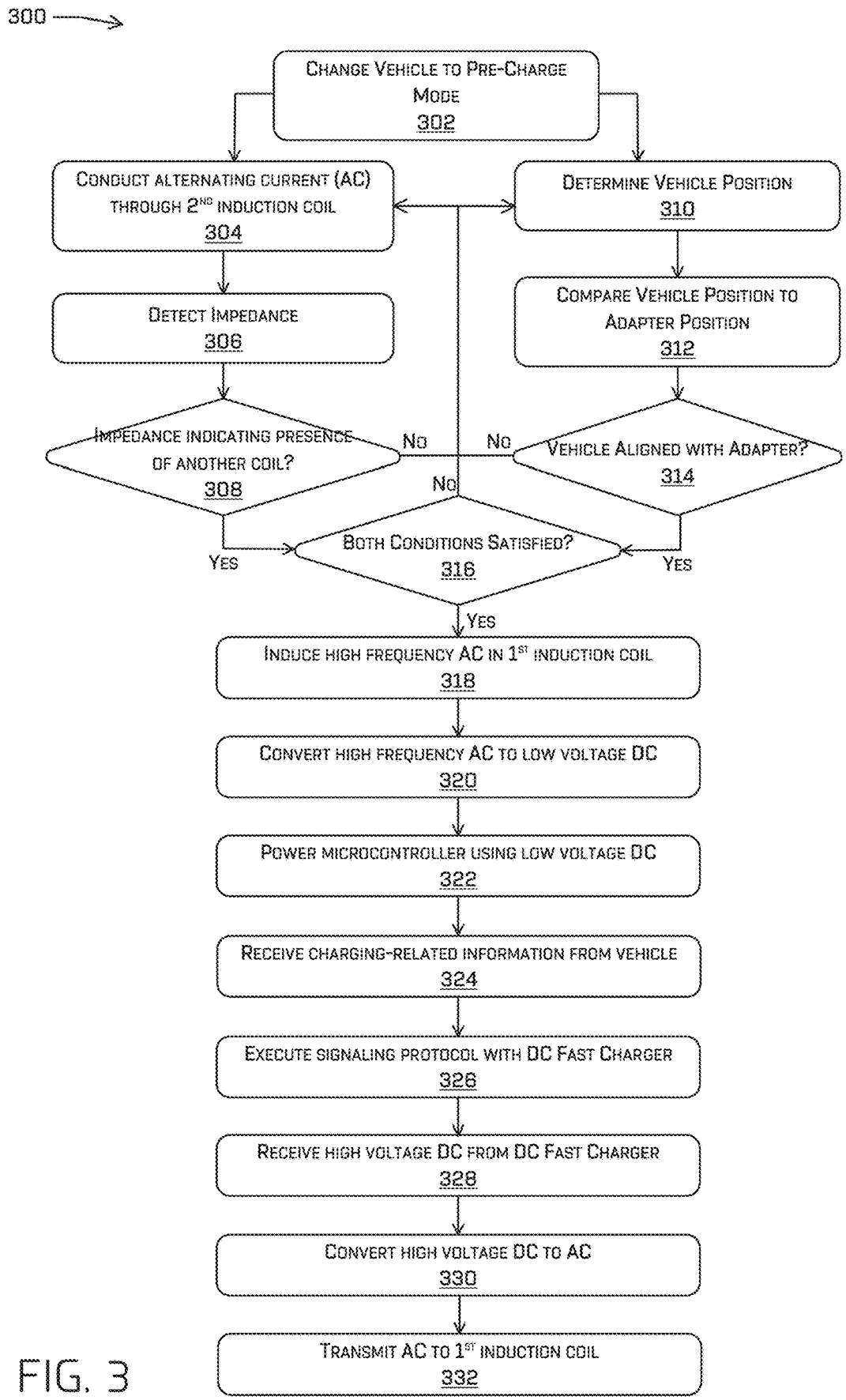
FIG. 3 is a flow diagram of an example process for charging one or more batteries of an autonomous vehicle.

FIG. 3 is a flowchart showing example processes involving techniques as described herein. The process illustrated in FIG. 3 may be described with reference to components and elements described above with reference to FIGS. 1A, 1B, and 2A-2D for convenience and ease of understanding. However, the processes illustrated in FIG. 3 is not limited to being performed using these components, and the components are not limited to performing the processes illustrated in FIG. 3. These processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. Referring now to FIG. 3, FIG. 3 includes a flow diagram with operations or steps for a method 300 for wirelessly charging a battery. The method 300 includes, at operation 302, a vehicle changing to a pre-charge mode. For example, in FIG. 2A, the vehicle 102 may enter a pre-charge mode when one or more conditions are met, such as the vehicle entering a charging-station depot or the vehicle 102 detecting that a charge state of the power storage unit 120 is below a threshold.

In a further example, operation 304 includes conducting AC through an induction coil (e.g., the second induction coil 116 on a vehicle or a receiver coil on a vehicle or a secondary coil on a vehicle). For example, the power storage unit 120 may provide a DC that is converted to an AC (e.g., using an inverter component of the converter 118), which is then provided to the second induction coil 116 (e.g., as a perturbation of a low voltage AC signal). In some examples, the operation 304 may include perturbating a relatively low voltage AC.

At operation 306, the method 300 includes detecting an impedance. For example, when the second induction coil 116 is at least partially overlapping with the first induction coil 114, the second induction coil 116 (or components associated with the second induction coil 116) may detect an impedance created by the first induction coil 114.

The method 300 includes, at operation 308, determining whether the impedance indicates a presence of another coil. For example, the impedance may be compared to a target range to determine whether the impedance is within the range. If the impedance is within the target range, then the method proceeds to 316. If the impedance is not within the target range, then the method proceeds back to 304.

In additional examples, after operation 302 (with the vehicle changing to the pre-charge mode), operation 310 includes (e.g., in parallel with, or serially to, operations 304, 306, and 308) determining a vehicle position. For example, one or more sensors 134a-134c of the vehicle 102 may be used to determine a vehicle location. Then, at operation 312, the vehicle position may be compared to an adapter position. For example, a map may store an adapter position (e.g., coordinates), and the vehicle position may be compared to the stored adapter position.

At operation 314, a determination is made (e.g., based on the comparison in operation 312) as to whether the vehicle position aligns with the adapter position. For example, in FIG. 2B, a determination might be made as to whether a position of the vehicle 102 (e.g., based on sensor data) aligns with a position of the adapter (e.g., based on map data). If the vehicle is aligned with the adapter, then the method proceeds to operation 316. If the positions are not aligned, then the method proceeds back to operation 310.

In a further example, the method 300 may include, at operation 316, determining whether both conditions are met in operations 308 and 314 (e.g., the impedance indicates the presence of another coil and the vehicle is aligned with the adapter). If both conditions are met, then the method 300 may proceed to operation 318, and if both conditions are not met, then the method 300 may proceed back to operations 304 and 310.

At operation 318, the method 300 includes inducing a high frequency AC in the first induction coil. For example, in FIG. 2B, the AC 204 may be provided to the second induction coil, and the magnetic field 206 may induce a high frequency AC in the first induction coil 114, which may be transmitted as the high frequency AC 210 to the current adjuster 212a or 212b.

The method 300 may also include, at operation 320, converting the high frequency AC to a low voltage DC. For example, the high frequency AC 210 may be converted by the power supply unit 228a to the low voltage DC 216. In another example, the high frequency AC 210 may be converted, by the converter 222b and the power supply unit 228b, to the low voltage DC 232. Once converted, at operation 322, the low voltage DC may be used to power a microcontroller (e.g., the microcontroller 226a or 226b).

Once the microcontroller has been powered, at operation 324, the method 300 includes receiving charging-related information from the vehicle. For example, in FIG. 2B, after powering the adapter 208b, the communications unit 113 may be used to receive charging-related information (e.g., 205) from the vehicle 102, such as a vehicle identifier, a current charge state, adapter-use authorization, details of the electric power system of the vehicle 102, and any other information that may be used to effectively and safely provide power from the DC fast charger to the vehicle 102. In additional examples, once the microcontroller has been powered, at operation 326, the method 300 includes executing a signaling protocol with the DC fast charger. For example, the controller 226a or 226b may transmit a message 218 or 234 to the DC fast charger.

The method 300 further includes, at operation 328, receiving a high voltage DC from the DC fast charger, and at operation 330, converting the high voltage DC to an AC. For example, the DC 236 is received by the converter 222a, which may convert the DC 236 to AC 240. Then, at operation 332, the method includes transmitting the AC to the first induction coil. For example, the AC 240 is transmitted to the first induction coil 114 to wirelessly induce a charge in the second induction coil 116 (e.g., to inductively charge the power storage unit 120 connected to the second induction coil 116).

The method 300 illustrated in FIG. 3 includes various steps. In some examples, all of the steps may be performed when wirelessly charging a battery. In other examples, only some of the steps depicted in FIG. 3 may be performed when wirelessly charging a battery. Furthermore, in the example provided by FIG. 3, a determination that the first and second inductive coils are proximate to one another (e.g., within a threshold distance) may be made based on a detected impedance exceeding a threshold. In other examples, the determination may be based on other, or additional, signals, such as a sensor data or wireless communications exchanged between the vehicle and the adapter and/or DC fast charger. In other examples, the powering of the microcontroller in operation 322 may be conditioned on different criteria (e.g., more or fewer conditions than those explicitly identified in FIG. 3) indicating a vehicle is proximate the adapter.

Figure 4:
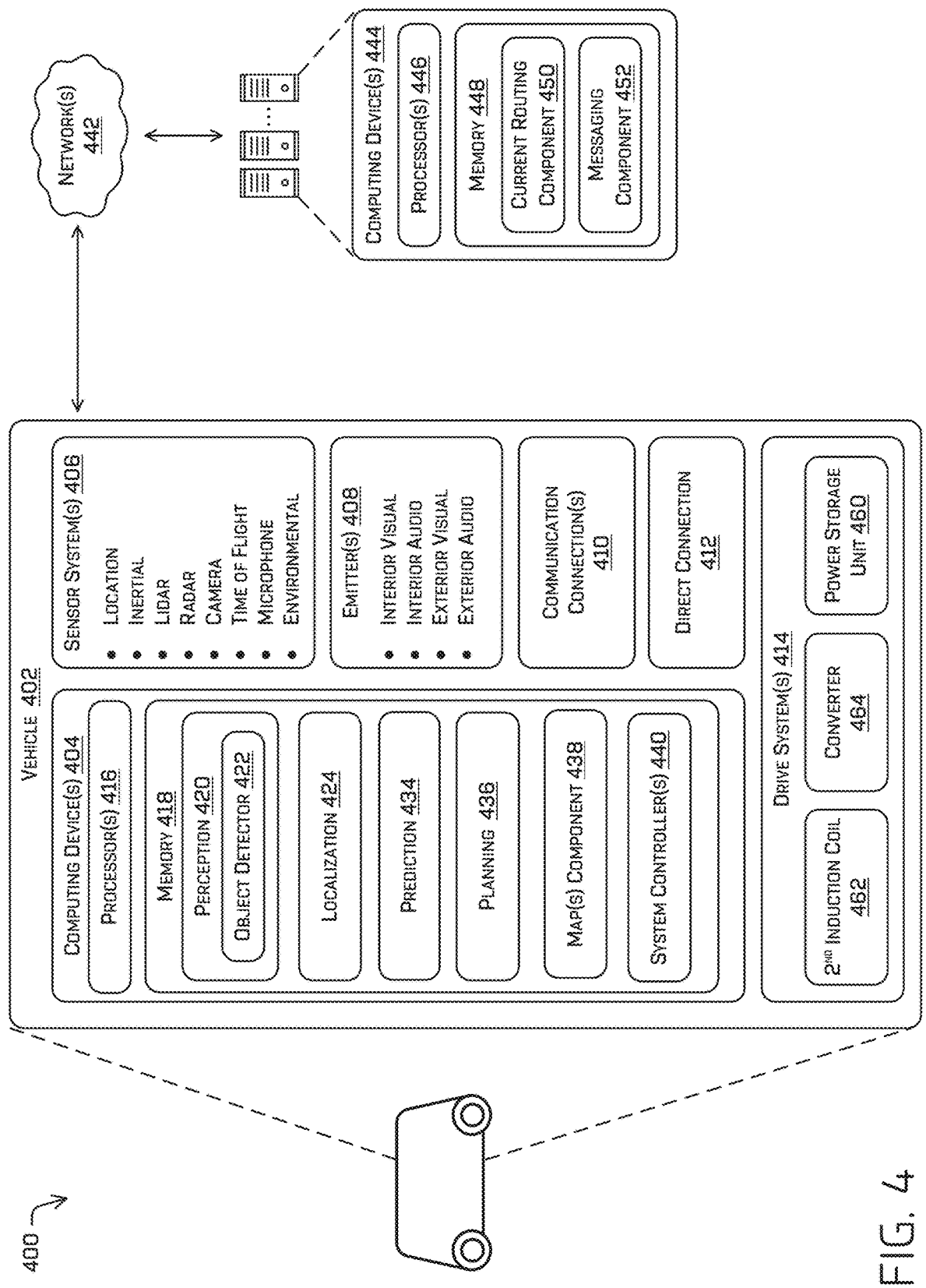
FIG. 4 is a block diagram illustrating an example system, including a vehicle, for performing some techniques as described herein.

FIG. 4 depicts a block diagram of an example system 400 for implementing the techniques described herein. In at least one example, the system 400 can include a vehicle 402. In the illustrated example system 400, the vehicle 402 is an autonomous vehicle; however, the vehicle 402 can be any other type of vehicle. The vehicle 402 may be the vehicle 102 depicted in FIGS. 1A and 2A-2D and may be configured to recharge a battery (e.g., power storage unit 460) using a wireless-charging adapter (e.g., adapter 108, adapter 208a, adapter 208b, and/or adapter 208c).

The vehicle 402 can be a driverless vehicle, such as an autonomous vehicle configured to operate according to a Level 4 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 402 can include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 can be configured to capture sensor data associated with an environment.

The one or more sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, ball joint sensors, chassis position sensors, etc. The one or more sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The one or more sensor system(s) 406 can provide input to the computing device 404.

The vehicle 402 can also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include one or more communication connection(s) 410 that enable communication between the vehicle 402 and one or more other local or remote computing device(s) (e.g., wireless-charging adapter, DC fast charger, a remote teleoperation computing device, etc.) or remote services. For instance, the one or more communication connection(s) 410 can facilitate communication with other local computing device(s) on the vehicle 402 and/or the one or more drive system(s) 414. Also, the one or more communication connection(s) 410 can allow the vehicle 402 to communicate with other nearby computing device(s) (e.g., other nearby vehicles, traffic signals, etc.).

The one or more communications connection(s) 410 can include physical and/or logical interfaces for connecting the computing device 404 to another computing device or one or more external networks 442 (e.g., the Internet). For example, the one or more communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 4G, etc.), satellite communication, dedicated short-range communications (DSRC), or any suitable wired or wireless communications protocol that enables the respective computing device to interface with the other computing device(s).

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery (e.g., power storage unit 460), a second induction coil 462 for wirelessly charging the high voltage battery, a motor to propel the vehicle, a converter 464 to bi-directionally convert between direct current and alternating current, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The computing device 404 can include one or more processor(s) 416 and memory 418 communicatively coupled with the one or more processor(s) 416. In the illustrated example, the memory 418 of the computing device 404 stores a perception component 420, a localization component 424, a prediction component 434, a planning component 436, a maps component 438, and one or more system controller(s) 440. Though depicted as residing in the memory 418 for illustrative purposes, it is contemplated that the perception component 420, the localization component 424, the prediction component 434, the planning component 436, the maps component 438, and the one or more system controller(s) 440 can additionally, or alternatively, be accessible to the computing device 404 (e.g., stored in a different component of vehicle 402) and/or be accessible to the vehicle 402 (e.g., stored remotely).

The perception component 420 can include functionality to perform object detection, segmentation, and/or classification. In some examples, the perception component 420 and/or the object detector 422 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional and/or alternative examples, the perception component 420 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

Further, the perception component 420 can include functionality to store perception data generated by the perception component 420. In some instances, the perception component 420 can determine a track corresponding to an object that has been classified as an object type. For purposes of illustration only, the perception component 420, using sensor system(s) 406 can capture one or more images of an environment, which may be used to determine information about an environment.

The stored perception data can, in some examples, include fused perception data captured by the vehicle. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In general, the object detector 422 can detect (among other things) semantic objects represented by sensor data. In some examples, the object detector 422 can identify such semantic objects and can determine a two-dimensional or a three-dimensional bounding box associated with the object. The object detector 422 can determine additional information such as a location, orientation, pose, and/or size (e.g., length, width, height, etc.) associated with the object. The object detector 422 can send data to other components of the system 400 for localization and/or determining calibration information, as discussed herein.

The localization component 424 can include functionality to receive data from the sensor system(s) 406 and/or other components to determine a position of the vehicle 402. For example, the localization component 424 can include and/or request/receive a three-dimensional map of an environment and can continuously determine a location of the autonomous vehicle within the map. In some instances, the localization component 424 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 424 can provide data to various components of the vehicle 402 to determine an initial position of an autonomous vehicle for generating a trajectory or for initial calibration.

The prediction component 434 can generate one or more probability maps representing prediction probabilities of possible locations of one or more objects in an environment. For example, the prediction component 434 can generate one or more probability maps for vehicles, pedestrians, animals, and the like within a threshold distance from the vehicle 402. In some instances, the prediction component 434 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 436 can determine a path for the vehicle 402 to follow to traverse through an environment. For example, the planning component 436 can determine various routes and paths and various levels of detail. In some instances, the planning component 436 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 436 can generate an instruction for guiding the autonomous vehicle along at least a portion of the route from the first location to the second location. In at least one example, the planning component 436 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 436 can alternatively, or additionally, use data from the perception component 420 and/or the prediction component 434 to determine a path for the vehicle 402 to follow to traverse through an environment. For example, the planning component 436 can receive data from the perception component 420 and/or the prediction component 434 regarding objects associated with an environment. Using this data, the planning component 436 can determine a route to travel from a first location (e.g., a current location) to a second location (e.g., a target location) to avoid objects in an environment. In at least some examples, such a planning component 436 may determine there is no such collision free path and, in turn, provide a path which brings vehicle 402 to a safe stop avoiding all collisions and/or otherwise mitigating damage.

The memory 418 can further include one or more maps 438 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps from the map(s) component 438 can include at least one map (e.g., images and/or a mesh). In some examples, the vehicle 402 can be controlled based at least in part on the map(s) component 438. That is, the map(s) component 438 can be used in connection with the perception component 420 (and sub-components), the localization component 424 (and sub-components), the prediction component 434, and/or the planning component 436 to determine a location of the vehicle 402, identify objects in an environment, generate prediction probabilit(ies) associated with objects and/or the vehicle 402, and/or generate routes and/or trajectories to navigate within an environment.

In at least one example, the computing device 404 can include one or more system controller(s) 440, which can be configured to control steering, propulsion, braking, safety, emitters, communication, and other systems of the vehicle 402. These system controller(s) 440 can communicate with and/or control corresponding systems of the drive system(s) 414 and/or other components of the vehicle 402, which may be configured to operate in accordance with a path provided from the planning component 436.

The vehicle 402 can connect to computing device(s) 444 via network 442 and can include one or more processor(s) 446 and memory 448 communicatively coupled with the one or more processor(s) 446. In at least one instance, the one or more processor(s) 446 can be similar to the processor(s) 416 and the memory 448 can be similar to the memory 418. In at least one example, the computing device(s) 444 may include a wireless-charging adapter (e.g., 108, 208a, 208b, and/or 208c). In the illustrated example, the memory 448 of the computing device(s) 444 stores a current routing component 450 and/or a messaging component 452. In at least one instance, the current routing component 450 may perform operations for routing currents (e.g., AC and/or DC) among various adapter components (e.g., inverter, rectifier, coil, power supply unit, gate driver(s), and/or controller(s)). In at least some other examples, the messaging component 452 may perform operations for transmitting messages to and/or receiving messages from internal adapter components (e.g., coil, controller, etc.) and/or external components (e.g., DC fast charger(s), vehicle(s), electricity-usage billing systems, etc.). For example, the messaging component 452 may perform operations for exchanging messages among adapter components (e.g., confirming connection to a DC fast charger plug, confirming wireless connection to a vehicle and/or to an onboard coil for charging a vehicle battery, etc.). In other examples, the messaging component 452 may exchange messages (e.g., 218 and/or 234) with a DC fast charger, messages with a vehicle (e.g., determining vehicle proximity, determining battery charge level, etc.), and/or messages with an onboard induction coil of a vehicle (e.g., determining proximity, alignment, etc.).

The processor(s) 416 of the computing device 404 and the processor(s) 446 of the computing device(s) 444 can be any suitable processor capable of executing instructions to process data and perform operations as described herein. By way of example and not limitation, the processor(s) 416 and 446 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 computing device 404 and the memory 448 of the computing device(s) 444 are examples of non-transitory computer-readable media. The memory 418 and 448 can store an operating system and one or more software applications, instructions, programs, and/or data to implement the methods described herein and the functions attributed to the various systems. In various implementations, the memory 418 and 448 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 418 and 448 can be implemented as a neural network. In some examples a machine learned model could be trained for object detection (e.g., image data used to detect a vehicle, a DC fast charger, or a wireless-charging adapter) or trajectory planning for parking in position to align coils.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet40, ResNet101, VGG, DenseNet, PointNet, and the like.

As described above with reference to FIGS. 1-4, techniques described herein can be useful for recharging a battery of an electric vehicle. In some instances, wireless charging may be more convenient than conventional physical-contact charging systems and may reduce maintenance associated with wear of the physical contacts. In addition, the wireless-charging adapter provides the ability to, upon determining proximity of an electric vehicle, mimic connection of the vehicle to a DC fast charger to initiate the provision of DC from the DC fast charger. Among other things, this may help to conserve energy (e.g., since the DC fast charger is not providing DC when a vehicle is not proximate) and may reduce safety concerns associated with a charged first induction coil when no second induction coil is present.

EXAMPLE CLAUSES

A: A wireless-charging adapter for wirelessly charging a battery of a vehicle, the wireless-charging adapter comprising: an electrical connector configured to connect to a direct current (DC) fast charger; a power converter coupled to the electrical connector; an induction coil coupled to the power converter; one or more processors; and one or more non-transitory computer-readable media storing instructions executable by the one or more processors, wherein the instructions, when executed, cause the wireless-charging adapter to perform operations comprising: detect an alternating current (AC) induced in the induction coil by a vehicle being positioned proximate to the induction coil; transmitting, at least partially based on detecting the AC, a message to the DC fast charger pursuant to a signaling protocol, the message indicative of a vehicle being connected to the DC fast charger for contact-based charging; receiving, from the DC fast charger, a DC; converting the DC to a second AC; and transmitting the second AC to the induction coil to inductively charge the battery.

B: The wireless-charging adapter of paragraph A further comprising, a power supply unit to provide, based on the AC induced in the induction coil by the vehicle, power to the one or more processors, wherein the one or more processors transmits the message to the DC fast charger based at least in part on receiving the power.

C: The wireless-charging adapter of paragraph B, wherein the operations further comprise: establishing, based at least in part on receiving the power, a wireless communication link between the wireless-charging adapter and the vehicle; receiving, from the vehicle and via the wireless communication link, data representing one or more vehicle-specific charging parameters; and controlling, based at least in part on the one or more vehicle-specific charging parameters, inductive charging of the battery.

D: The wireless-charging adapter of paragraph C, wherein the operations further comprise: determining the wireless communication link is terminated; and stopping, based on the communication link being terminated, the transmitting of the second AC to the induction coil.

E: The wireless-charging adapter of any one or more of paragraphs A-D, wherein the operations further comprise: receiving, from the DC fast charger, an identification of the signaling protocol, which includes: SAE J1772, CHAdeMO, IEC-61851-C, or GB/T; and formatting the message pursuant to the signaling protocol.

F: A method of wirelessly charging a battery of a vehicle, the method comprising: receiving a signal indicating that a vehicle is proximate to a wireless-charging adapter; transmitting, via one or more processors and based at least partially on the signal being received, a message via a contact-based coupling to a charging station pursuant to a signaling protocol, wherein the message is indicative of the vehicle being coupled to the charging station for contact-based charging; receiving, from the charging station, via the contact-based coupling, power; and transmitting, by the wireless-charging adapter, non-contact power to the vehicle, wherein the non-contact power is derived from the power from the contact-based coupling.

G: The method of paragraph F, wherein the non-contact power is transmitted via a first induction coil of the wireless-charging adapter to a second induction coil of the vehicle, and wherein, prior to transmitting the message, the method further comprises: receiving an alternating current (AC) from the first induction coil, the AC being induced in the first induction coil by the second induction coil; and powering, using the AC, the wireless-charging adapter.

H: The method of one or more of paragraph F or G further comprising: establishing a wireless communication link between the wireless-charging adapter and the vehicle; receiving, by the wireless-charging adapter and via the wireless communication link, one or more vehicle-specific charging parameters; and controlling, based at least in part on the one or more vehicle-specific charging parameters, inductive charging of the battery.

I: The method of any one or more of paragraphs F-H further comprising: receiving sensor data indicating a position of the vehicle; receiving map data indicating a position of the wireless-charging adapter; determining, based on the position of the vehicle and the position of the wireless-charging adapter, the vehicle is proximate to the wireless-charging adapter; and transmitting, based on the vehicle being proximate to the wireless-charging adapter, the message to the charging station.

J: The method of any one or more of paragraphs F-I, wherein the non-contact power is transmitted via a first induction coil of the wireless-charging adapter to a second induction coil of the vehicle, and wherein, prior to transmitting the message, the method further comprises: detecting, by the second induction coil and based on the vehicle being proximate the wireless-charging adapter, an impedance created by the first induction coil; and inducing, by the second induction coil and based at least in part on the impedance, power in the first induction coil.

K: The method of any one or more of paragraphs F-J, wherein the non-contact power is transmitted via a first induction coil of the wireless-charging adapter to a second induction coil of the vehicle, and wherein, prior to transmitting the message, the method further comprises: detecting, by the second induction coil, an impedance indicating the first induction coil is within a threshold distance from the second induction coil; determining, based on a position of the vehicle and a position of the wireless-charging adapter, the vehicle is aligned for inductive charging with the wireless-charging adapter; and powering, based on the impedance being detected and the vehicle being aligned, the wireless-charging adapter.

L: The method of any one or more of paragraphs F-K, wherein the signal includes sensor data from a proximity sensor, the sensor data indicating a first induction coil of the wireless-charging adapter and a second induction coil of the vehicle are within a threshold distance to each other.

M: The method of any one or more of paragraphs F-L further comprising, determining, based on a query to the charging station, the signaling protocol, which includes: SAE J1772, CHAdeMO, IEC-61851-C, or GB/T; and formatting the message pursuant to the signaling protocol.

N: A wireless-charging adapter comprising: an electrical connector to connect to a charging station; a power converter coupled to the electrical connector; a first induction coil coupled to the power converter; and one or more processors; and one or more non-transitory computer-readable media storing instructions executable by the one or more processors, wherein the instructions, when executed, cause the wireless-charging adapter to perform operations comprising: receiving a signal indicating that a vehicle is proximate to a wireless-charging adapter; transmitting, based at least partially on the signal being received, a message via a contact-based coupling to the charging station pursuant to a signaling protocol, wherein the message is indicative of the vehicle being coupled to the charging station for contact-based charging; receiving, from the charging station and via the contact-based coupling, power from the charging station; and transmitting, via the first induction coil, non-contact power to the vehicle, wherein the non-contact power is derived from the power from the contact-based coupling.

O: The wireless-charging adapter of paragraph N, wherein the operations further comprise: receiving, from the vehicle, first data representing a vehicle-specific charging parameters; and transmitting, to the charging station, second data representing the vehicle-specific charging parameters.

P: The wireless-charging adapter of one or more paragraph N or O, wherein, after the transmitting the non-contact power to the vehicle, the operations further comprise: receiving, from the vehicle, a second signal indicating one or more of a state of charge (SOC) or the vehicle is greater than a threshold distance away from the wireless-charging adapter; and reducing the power from the charging station.

Q: The wireless-charging adapter of any one or more of paragraphs N-P, wherein, prior to the transmitting the message, the operations further comprise: establishing a wireless communication link with one or more of a server or the vehicle; and receiving, via the wireless communication link, vehicle-specific charging parameters.

R: The wireless-charging adapter of any one or more of paragraphs N-Q, wherein the non-contact power is transmitted to a second induction coil of the vehicle, and wherein, prior to transmitting the message, the operations further comprise: receiving an alternating current (AC) from the first induction coil, the AC being induced in the first induction coil by the second induction coil; and powering, using the AC, the wireless-charging adapter.

S: The wireless-charging adapter of any one or more of paragraphs N-R further comprising, a disconnect device configured to control the power from the charging station, wherein the operations further comprise activating, based at least in part on the signal, the disconnect device to permit the power to be received.

T: The wireless-charging adapter of any one or more of paragraphs N-S, wherein the operations further comprise: receiving, from the charging station, an identification of the signaling protocol, which includes: SAE J1772, CHAdeMO, IEC-61851-C, or GB/T; and formatting the message pursuant to the signaling protocol.

While the example clauses described above are described with respect to one particular implementation, it should be understood that, in the context of this document, the content of the example clauses may also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method of wirelessly charging a battery of a vehicle, the method comprising:
   receiving a signal indicating that a vehicle is proximate to a wireless-charging adapter;
   transmitting, via one or more processors and based at least partially on the signal being received, a message via a contact-based coupling to a charging station pursuant to a signaling protocol, wherein the message is indicative of the vehicle being coupled to the charging station for contact-based charging;
   receiving, from the charging station, via the contact-based coupling, power; and
   transmitting, by the wireless-charging adapter, non-contact power to the vehicle, wherein the non-contact power is derived from the power from the contact-based coupling.

2. The method of claim 1, wherein the non-contact power is transmitted via a first induction coil of the wireless-charging adapter to a second induction coil of the vehicle, and wherein, prior to transmitting the message, the method further comprises:
   receiving an alternating current (AC) from the first induction coil, the AC being induced in the first induction coil by the second induction coil; and
   powering, using the AC, the wireless-charging adapter.

3. The method of claim 1 further comprising:
   establishing a wireless communication link between the wireless-charging adapter and the vehicle;
   receiving, by the wireless-charging adapter and via the wireless communication link; one or more vehicle-specific charging parameters; and
   controlling, based at least in part on the one or more vehicle-specific cha parameters, inductive charging of the battery.

4. The method of claim 3 further comprising:
   determining that the wireless communication link is terminated; and
   stopping, based on the wireless communication link being terminated, the inductive charging of the vehicle.

5. The method of claim 1 further comprising:
   receiving sensor data indicating a position of the vehicle;
   receiving map data indicating a position of the wireless-charging adapter;
   determining, based on the position of the vehicle and the position of the wireless-charging adapter, the vehicle is proximate to the wireless-charging adapter; and
   transmitting, based on the vehicle being proximate to the wireless-charging adapter, the message to the charging station.

6. The method of claim 1, wherein the non-contact power is transmitted via a first induction coil of the wireless-charging adapter to a second induction coil of the vehicle, and wherein, prior to transmitting the message, the method further comprises:
   detecting, by the second induction coil and based on the vehicle being proximate the wireless-charging adapter, an impedance created by the first induction coil; and
   inducing, by the second induction coil and based at least in part on the impedance, power in the first induction coil.

7. The method of claim 1, wherein the non-contact power is transmitted via a first induction coil of the wireless-charging adapter to a second induction coil of the vehicle, and wherein, prior to transmitting the message, the method further comprises:
   detecting, by the second induction coil, an impedance indicating the first induction coil is within a threshold distance from the second induction coil;
   determining, based on a position of the vehicle and a position of the wireless-charging adapter, the vehicle is aligned for inductive charging with the wireless-charging adapter; and
   powering, based on the impedance being detected and the vehicle being aligned, the wireless-charging adapter.

8. The method of claim 1, wherein the signal includes sensor data from a proximity sensor, the sensor data indicating a first induction coil of the wireless-charging adapter and a second induction coil of the vehicle are within a threshold distance to each other.

9. The method of claim 1 further comprising,
   determining, based on a query to the charging station, the signaling protocol, which includes:
   SAE J1772,
   CHAdeMO,
   IEC-61851-3, or
   GB/T; and
   formatting the message pursuant to the signaling protocol.

10. The method of claim 1, wherein power is provided to the one or more processors by a power supply unit, and further wherein the one or more processors transmit the message to the charging station based at least in part on receiving the power provided by the power supply unit.

11. A wireless-charging adapter comprising:
   an electrical connector to connect to a charging station;
   a power converter coupled to the electrical connector;
   a first induction coil coupled to the power converter;
   one or more processors; and
   one or more non-transitory computer-readable media storing instructions executable by the one or more processors, wherein the instructions, when executed, cause the wireless-charging adapter to perform operations comprising:
   receiving a signal indicating that a vehicle is proximate to a wireless-charging adapter;
   transmitting, based at least partially on the signal being received, a message via a contact-based coupling to the charging station pursuant to a signaling protocol, wherein the message is indicative of the vehicle being coupled to the charging station for contact-based charging;
   receiving, from the charging station and via the contact-based coupling, power from the charging station; and
   transmitting, via the first induction coil, non-contact power to the vehicle, wherein the non-contact power is derived from the power from the contact-based coupling.

12. The wireless-charging adapter of claim 11, wherein the operations further comprise:
   receiving, from the vehicle, first data representing a vehicle-specific charging parameters; and
   transmitting, to the charging station, second data representing the vehicle-specific charging parameters.

13. The wireless-charging adapter of claim 11, wherein, after the transmitting the non-contact power to the vehicle, the operations further comprise:
receiving, from the vehicle, a second signal indicating one or more of a state of charge (SOC) or the vehicle is greater than a threshold distance away from the wireless-charging adapter; and
reducing the power from the charging station.

14. The wireless-charging adapter of claim 11, wherein, prior to the transmitting the message, the operations further comprise:
establishing a wireless communication link with one or more of a server or the vehicle; and
receiving, via the wireless communication link, vehicle-specific charging parameters.

15. The wireless-charging adapter of claim 14, the operations further comprising:
determining that the wireless communication link is terminated; and
stopping, based on the wireless communication link being terminated, transmission of the Don-contact power to the vehicle.

16. The wireless-charging adapter of claim 11, Wherein the non-contact power is transmitted to a second induction coil of the vehicle, and wherein, prior to transmitting the message, the operations further comprise:
receiving an alternating current (AC) from the first induction coil, the AC being induced in the first induction coil by the second induction coil; and
powering, using the AC, the wireless-charging adapter.

17. The wireless-charging adapter of claim 11 further comprising, a disconnect device configured to control the power from the charging station, wherein the operations further comprise activating, based at least in part on the signal, the disconnect device to permit the power to be received.

18. The wireless-charging adapter of claim 11, wherein the operations further comprise:
receiving, from the charging station, an identification of the signaling protocol, which includes:
SAE J1772,
CHAdeMO,
IEC-61$51-3, or
GB/T; and
formatting the message pursuant to the signaling protocol.

19. The wireless-charging adapter of claim 11, further comprising
a power supply unit to provide, based on the signal that the vehicle is proximate to the wireless-charging adapter, power to the one or more processors, wherein the one or more processors transmit the message to the charging station based at least in part on receiving the power provided by the power supply unit.

20. One or more non-transitory computer-readable media storing instructions executable by one or more processors, wherein the instructions, when executed, cause a wireless-charging adapter to perform operations comprising:
receiving a signal indicating that a vehicle is proximate to the wireless-charging adapter;
transmitting, via one or more: processors and based at least partially on the signal being received, a message via a contact-based coupling to a charging station pursuant to a signaling protocol, wherein the message is indicative of the vehicle being coupled to the charging station for contact-based charging;
receiving, from the charging station, via the contact-based coupling, power; and
transmitting, by the wireless-charging adapter, non-contact power to the vehicle, wherein the non-contact power is derived from the power from the contact-based coupling.

* * * * *